United States Patent
Rochulus et al.

(10) Patent No.: US 11,364,853 B2
(45) Date of Patent: Jun. 21, 2022

(54) UNIVERSAL HOLDER AND VEHICLE INTERIOR LINING COMPONENT

(71) Applicant: Ford Global Technologies, LLC, Dearborn, MI (US)

(72) Inventors: Thomas Rochulus, Cologne (DE); Daniel Trinczek, Cologne (DE); Pablo Villar Mesa, Nuess (DE); Daniel Vieira, Cologne (DE)

(73) Assignee: Ford Global Technologies, LLC, Dearborn, MI (US)

( * ) Notice: Subject to any disclaimer, the term of this patent is extended or adjusted under 35 U.S.C. 154(b) by 199 days.

(21) Appl. No.: 16/877,624

(22) Filed: May 19, 2020

(65) Prior Publication Data

US 2020/0369217 A1 Nov. 26, 2020

(30) Foreign Application Priority Data

May 20, 2019 (DE) .......................... 102019207307.7

(51) Int. Cl.
*B60R 11/00* (2006.01)

(52) U.S. Cl.
CPC ....... *B60R 11/00* (2013.01); *B60R 2011/0007* (2013.01); *B60R 2011/0021* (2013.01)

(58) Field of Classification Search
CPC ............ B60R 11/00; B60R 2011/0007; B60R 2011/0021; B60R 2011/0064
USPC ....................................................... 296/37.8
See application file for complete search history.

(56) References Cited

U.S. PATENT DOCUMENTS

| 2,956,687 | A | * | 10/1960 | Robichaud | ......... | B65D 81/1075 |
| | | | | | | 206/217 |
| 5,588,055 | A | * | 12/1996 | Williamson | ........ | B60R 11/0241 |
| | | | | | | 379/426 |
| 5,745,565 | A | | 4/1998 | Wakefield | | |
| 5,791,460 | A | | 8/1998 | Fitzgerald et al. | | |
| 5,897,090 | A | * | 4/1999 | Smith | ..................... | G01N 35/04 |
| | | | | | | 248/314 |
| 6,367,761 | B1 | * | 4/2002 | Suzuki | ...................... | G09F 1/14 |
| | | | | | | 40/652 |
| 7,668,309 | B2 | * | 2/2010 | Wilcox | ............... | B60R 11/0241 |
| | | | | | | 379/454 |
| 8,303,016 | B2 | * | 11/2012 | Pauken | ................... | B60R 11/02 |
| | | | | | | 248/302 |
| 9,097,489 | B2 | * | 8/2015 | Chiang | ................... | F42B 39/02 |
| 10,259,370 | B2 | * | 4/2019 | Filipovich | .............. | B60N 3/108 |
| 10,486,615 | B1 | * | 11/2019 | Shibata | .............. | B60R 11/0241 |
| 2003/0128840 | A1 | * | 7/2003 | Luginbill | ................ | H04M 1/04 |
| | | | | | | 379/455 |

(Continued)

FOREIGN PATENT DOCUMENTS

DE 102011055195 A1 * 5/2013 ............. B60R 11/02
GB 2439985 A 1/2008

*Primary Examiner* — Pinel E Romain
(74) *Attorney, Agent, or Firm* — Vichit Chea; Price Heneveld LLP (57) ABSTRACT

A universal holder for retaining an item on a vehicle interior lining component, wherein the universal holder has at least one retaining receptacle with at least one access opening. In order to provide such a universal holder, with which differently designed items can be retained in a better manner, the universal holder has at least one retaining lip that at least largely closes the access opening and is produced at least partially from an elastomer.

19 Claims, 12 Drawing Sheets

(56) References Cited

U.S. PATENT DOCUMENTS

| | | | |
|---|---|---|---|
| 2004/0086112 A1* | 5/2004 | Hilger | B60R 11/0241 379/455 |
| 2004/0213405 A1* | 10/2004 | Wilcox | H04M 1/04 379/455 |
| 2006/0027517 A1* | 2/2006 | Bahu | B60R 11/00 211/189 |
| 2007/0036352 A1 | 2/2007 | Wilcox et al. | |
| 2012/0298708 A1* | 11/2012 | DeAngelo | B60N 3/103 224/567 |
| 2017/0324853 A1* | 11/2017 | Ranganathan | H04M 1/04 |
| 2018/0201197 A1* | 7/2018 | Gaw, Jr. | B60R 11/02 |

* cited by examiner

UNIVERSAL HOLDER AND VEHICLE INTERIOR LINING COMPONENT

FIELD OF THE DISCLOSURE

The present invention generally relates to holders for retaining items, and more particularly relates to a universal holder for retaining an item on a vehicle interior lining component.

BACKGROUND OF THE DISCLOSURE

In vehicle interiors, differently designed holders and/or storage compartments for items can be arranged to stow or store the items during a journey. One or more holders or a storage compartments are commonly arranged on vehicle interior lining components. For example, holders are commonly provided to hold portable electronic accessories, such as a phone.

It would be desirable to provide a universal holder that may enable differently designed items to be effectively retained.

SUMMARY OF THE DISCLOSURE

According to a first aspect of the present disclosure, a universal holder for retaining an item on a vehicle interior lining component is disclosed. The universal holder includes a retaining receptacle with an access opening, and at least one retaining lip that at least largely closes the access opening and is produced at least partially from an elastomer.

According to a second aspect of the present disclosure, a universal holder for retaining an item on a vehicle interior lining component is disclosed. The universal holder including a retaining receptacle with an access opening, and at least one retaining lip that at least largely closes the access opening and is produced at least partially from an elastomer is disclosed, wherein the retaining receptacle narrows at least regionally in the direction of a receptacle bottom located opposite the access opening.

According to a third aspect of the present disclosure, a vehicle interior lining component is provided. The vehicle interior lining component includes a holder receptacle, and a universal holder arranged at least partially in the holder receptacle on the vehicle interior lining component. The universal holder includes a retaining receptacle with an access opening, and at least one retaining lip that at least largely closes the access opening and is produced at least partially from an elastomer.

These and other aspects, objects, and features of the present invention will be understood and appreciated by those skilled in the art upon studying the following specification, claims, and appended drawings.

DETAILED DESCRIPTION OF THE PREFERRED EMBODIMENTS

In the different figures, identical parts are always provided with the same reference signs, and for this reason they are generally only described once.

Figure 1A:
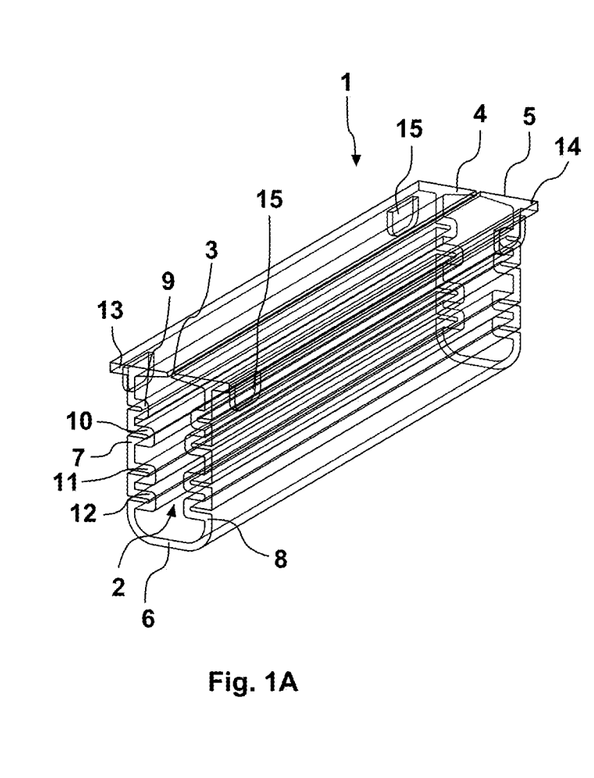
FIG. 1A is a schematic and perspective illustration of an exemplary embodiment of a universal holder, according to one embodiment.

FIG. 1A shows a schematic and perspective illustration of an exemplary embodiment of a universal holder 1 for retaining an item (not shown) on a vehicle interior lining component (not shown) such as a trim component. The universal holder 1 may be produced in one piece from an elastomer and has a retaining receptacle 2 with an access opening 3. In addition, the universal holder 1 has two retaining lips 4 and 5 that together largely close the access opening 3 and extend in opposite directions to one another.

The retaining receptacle 2 narrows regionally in the direction of a receptacle bottom 6 located opposite the access opening 3. Four retaining ribs 9 to 12 extend in pairs on opposite sides parallel to the access opening 3 and are arranged on each lateral inner wall 7 and 8, respectively, of the retaining receptacle 2. The retaining ribs 9 to 12 arranged on a lateral inner wall 7 or 8, respectively, are arranged at different distances from the access opening 3. The respective retaining rib 9, 10, 11 or 12 projects farther into the retaining receptacle the closer the retaining rib 9, 10, 11 or 12 is arranged to the receptacle bottom 6. Two retaining ribs 9, 10, 11 or 12 that are arranged on the mutually opposite lateral inner walls 7 and 8 and projected into the retaining receptacle 2 in opposite directions to one another lie opposite one another in pairs. Thus, the retaining receptacle 2 narrows in the direction of the receptacle bottom 6 with regard to the mutually facing ends of the retaining ribs 9 to 12.

The universal holder 1 has, on each lateral inner wall 7 and 8, a laterally outwardly projecting flange 13 and 14, respectively, on which two fastening elements 15 are arranged for fastening of the universal holder 1 to the vehicle interior lining component.

Figure 1B:
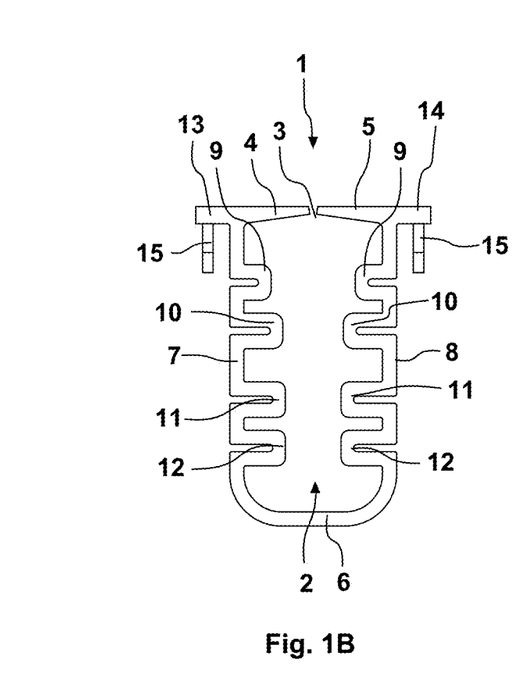
FIG. 1B is a schematic sectional illustration of the universal holder shown in FIG. 1A.

FIG. 1B shows a schematic sectional illustration of the universal holder 1 shown in FIG. 1A. In particular the narrowing, described above with reference to FIG. 1A, of the retaining receptacle 2 is shown, which is brought about by the retaining ribs 9 to 12.

Figure 1C:
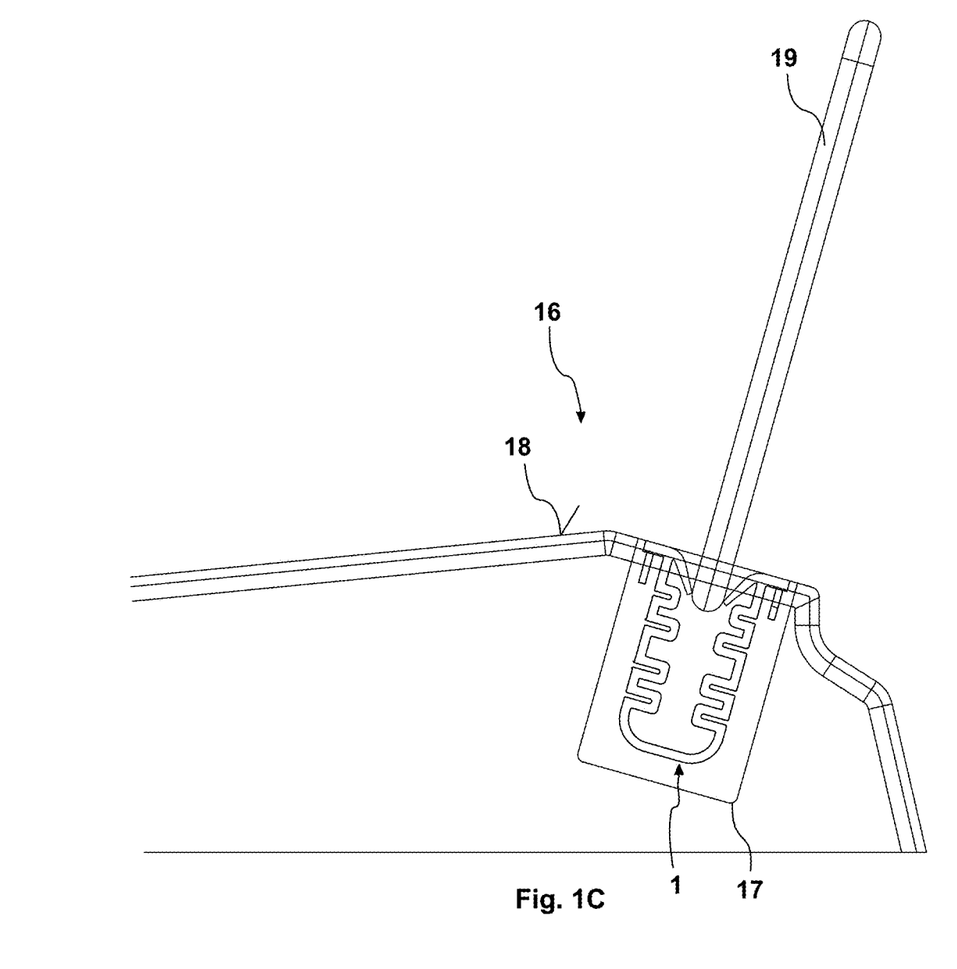
FIG. 1C is a schematic sectional illustration of an exemplary embodiment of a vehicle interior lining component having the universal holder of FIG. 1A with an inserted item and elastically deformed retaining lips bearing against the item, according to one embodiment.

FIG. 1C shows a schematic sectional illustration of an exemplary embodiment of a vehicle interior lining component 16 having a universal holder 1, according to the embodiment shown in FIGS. 1A and 1B. The universal holder 1 is arranged entirely in a holder receptacle 17 on the vehicle interior lining component 16. The universal holder 1 is arranged in the holder receptacle 17 in such a way that the retaining lips 4 and 5 are arranged in a manner aligned with a surface 18, arranged next to the holder receptacle 17, or with the vehicle interior lining component 16. An item 19 in the form of a smartphone is illustrated partially introduced into the retaining receptacle 2 of the universal holder 1, such that the retaining lips 4 and 5 have been elastically deformed and bear against the outside of the item 19.

Figure 2A:
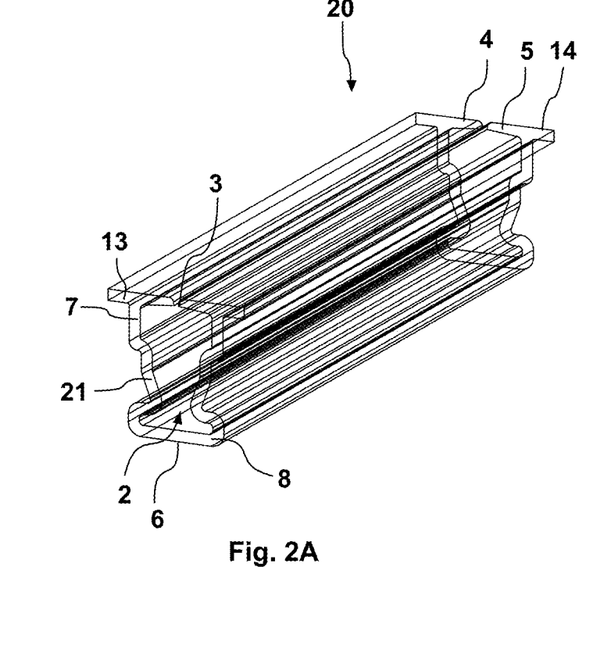
FIG. 2A is a schematic and perspective illustration of a further exemplary embodiment of a universal holder.

FIG. 2A shows a schematic and perspective illustration of a further exemplary embodiment of a universal holder 20 for retaining an item (not shown) on a vehicle interior lining component (not shown). The universal holder 20 differs from the exemplary embodiment shown in FIGS. 1A-1C in particular in that only one retaining rib 21 with a height that increases in the direction of the receptacle bottom 6 is arranged on each lateral inner wall 7 and 8, respectively, thereby creating the narrowing of the retaining receptacle 2. Furthermore, the universal holder 20 does not have any fastening elements as per the exemplary embodiment shown in FIGS. 1A-1C. To avoid repetitions, reference is otherwise made to the above description for FIGS. 1A to 1C.

Figure 2B:
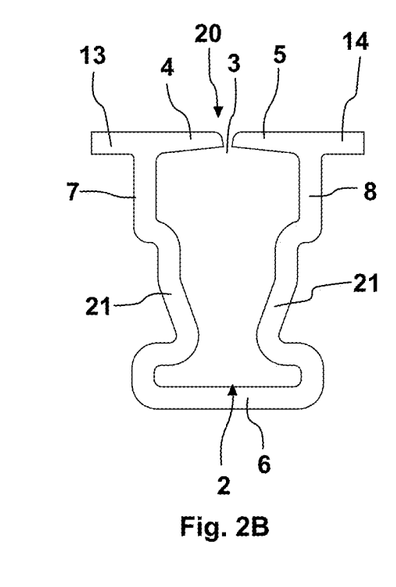
FIG. 2B is a schematic sectional illustration of the universal holder shown in FIG. 2A.

FIG. 2B shows a schematic sectional illustration of the universal holder 20 shown in FIG. 2A. In particular the narrowing, described above with reference to FIG. 2A, of the retaining receptacle 2 is shown, which is brought about by the retaining ribs 21.

Figure 2C:
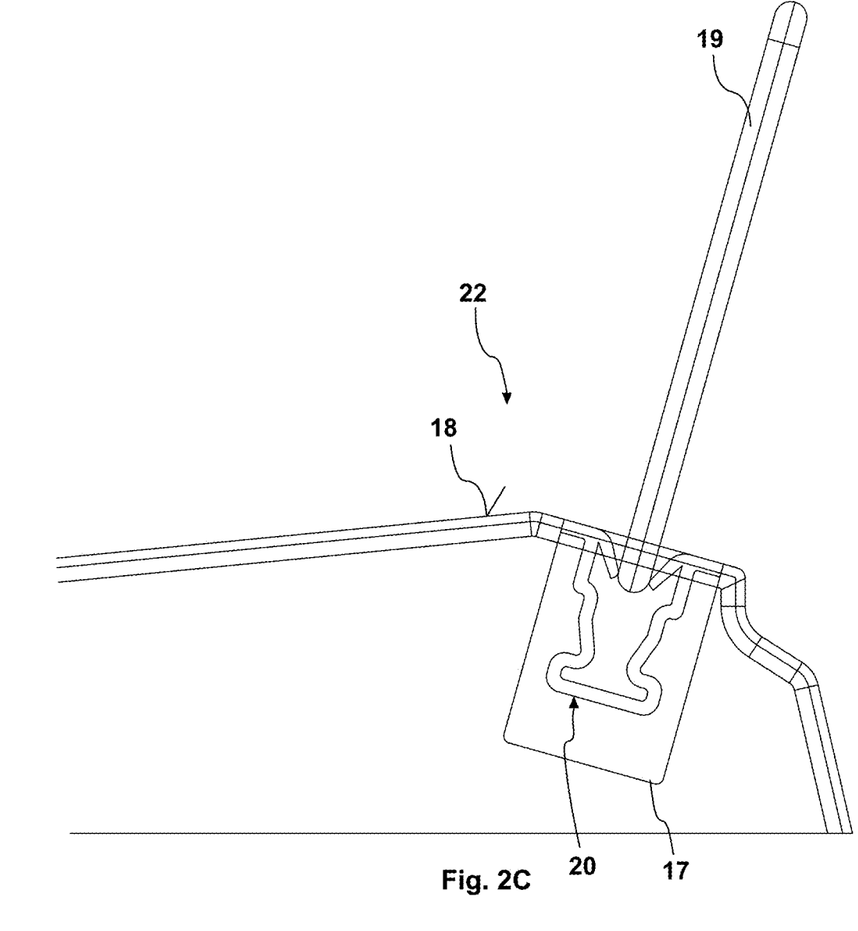
FIG. 2C is a schematic sectional illustration of a further exemplary embodiment of a vehicle interior lining component having the universal holder of FIG. 2A with an inserted item and elastically deformed retaining lips bearing against the item.

FIG. 2C shows a schematic sectional illustration of a further exemplary embodiment of a vehicle interior lining component 22 having a universal holder 20 according to FIGS. 2A and 2B. The universal holder 20 is arranged entirely in a holder receptacle 17 on the vehicle interior lining component 22. The universal holder 20 is arranged in the holder receptacle 17 in such a way that the retaining lips 4 and 5 are arranged in a manner aligned with a surface 18, arranged next to the holder receptacle 17, of the vehicle interior lining component 22. An item 19 in the form of a smartphone is illustrated partially introduced into the retaining receptacle 2 of the universal holder 20, such that the retaining lips 4 and 5 have been elastically deformed and bear against the outside of the item 19.

Figure 3A:
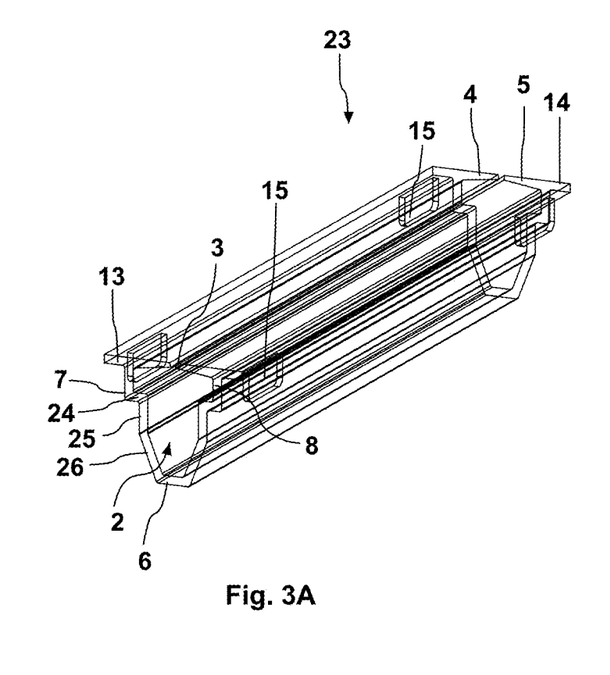
FIG. 3A is a schematic and perspective illustration of a further exemplary embodiment of a universal holder.

FIG. 3A shows a schematic and perspective illustration of a further exemplary embodiment of a universal holder 23 for retaining an item (not shown) on a vehicle interior lining component (not shown). The universal holder 23 differs from the exemplary embodiment shown in FIGS. 1A-1C in particular in that no retaining ribs are arranged on the lateral inner walls 7 and 8, but rather that each lateral inner wall 7 and 8, respectively, has a narrowing step 24 that projects into the retaining receptacle 2, a lateral inner wall portion 25 adjoining the narrowing step 24 on the receptacle bottom side and extending perpendicularly to the access opening 3, and a narrowing portion 26 that connects the lateral inner wall portion 25 to the receptacle bottom 6 and extends in an inclined manner, wherein the narrowing portions 26 bring about narrowing of the retaining receptacle 2. To avoid repetitions, reference is otherwise made to the above description for FIGS. 1A-1C.

Figure 3B:
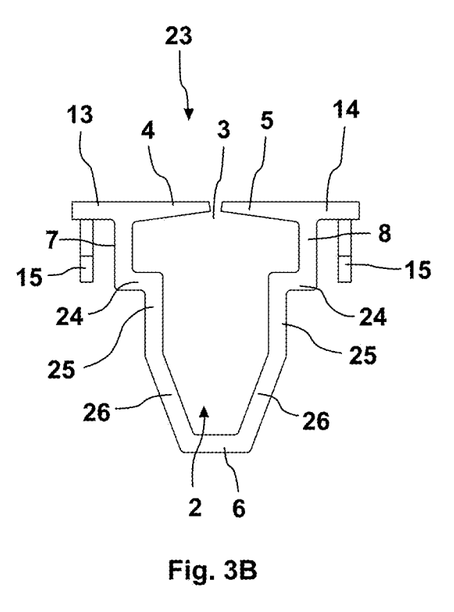
FIG. 3B is a schematic sectional illustration of the universal holder shown in FIG. 3A.

FIG. 3B shows a schematic sectional illustration of the universal holder 23 shown in FIG. 3A. In particular the narrowing, described above with reference to FIG. 3A, of the retaining receptacle 2 is shown, which is brought about by the narrowing steps 24 and the narrowing portions 26.

Figure 3C:
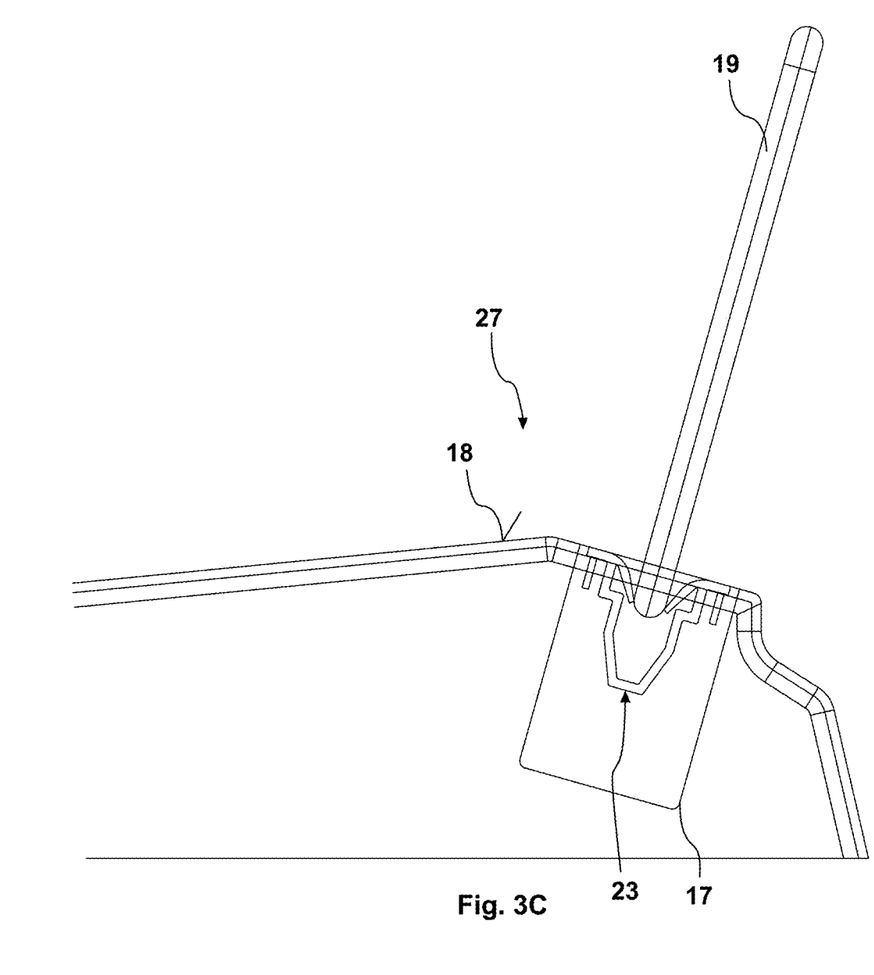
FIG. 3C is a schematic sectional illustration of a further exemplary embodiment of a vehicle interior lining component having the universal holder of FIG. 3A with an inserted item and elastically deformed retaining lips bearing against the item.

FIG. 3C shows a schematic sectional illustration of a further exemplary embodiment of a vehicle interior lining component 27 having a universal holder 23 according to FIGS. 3A and 3B. The universal holder 23 is arranged entirely in a holder receptacle 17 on the vehicle interior lining component 27. The universal holder 23 is arranged in the holder receptacle 17 in such a way that the retaining lips 4 and 5 are arranged in a manner aligned with a surface 18, which is arranged next to the holder receptacle 17, of the vehicle interior lining component 27. An item 19 in the form of a smartphone is illustrated partially introduced into the retaining receptacle 2 of the universal holder 23, such that the retaining lips 4 and 5 have been elastically deformed and bear against the outside of the item 19.

Figure 4A:
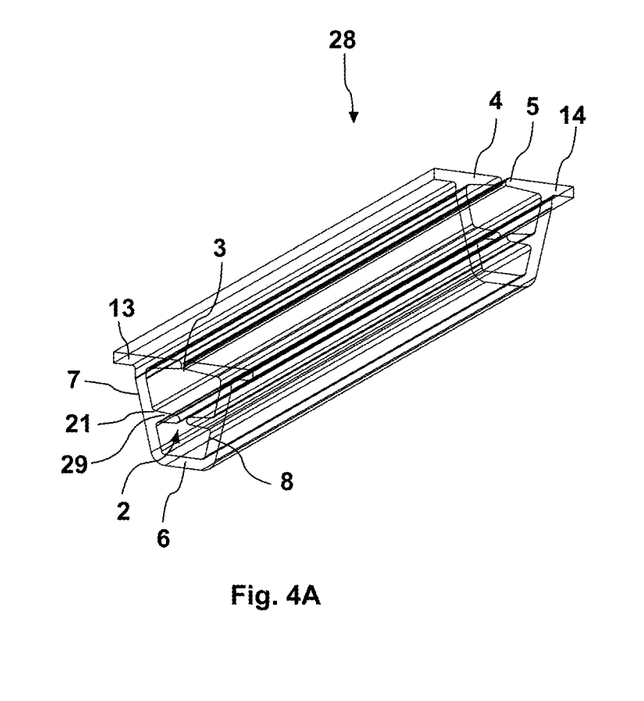
FIG. 4A is a schematic and perspective illustration of a further exemplary embodiment of a universal holder.

FIG. 4A shows a schematic and perspective illustration of a further exemplary embodiment of a universal holder 28 for retaining an item (not shown) on a vehicle interior lining component (not shown). The universal holder 28 differs from the exemplary embodiment shown in FIGS. 1A-1C in particular in that the lateral inner walls 7 and 8 are arranged in an inclined manner, forming a narrowing of the retaining receptacle 2, in that only one lip-like retaining rib 29 is arranged on each lateral inner wall 7 and 8, respectively, and in that the universal holder 28 does not have any fastening elements as per the exemplary embodiment shown in FIGS. 1A-1C. To avoid repetitions, reference is otherwise made to the above description for FIGS. 1A-1C.

Figure 4B:
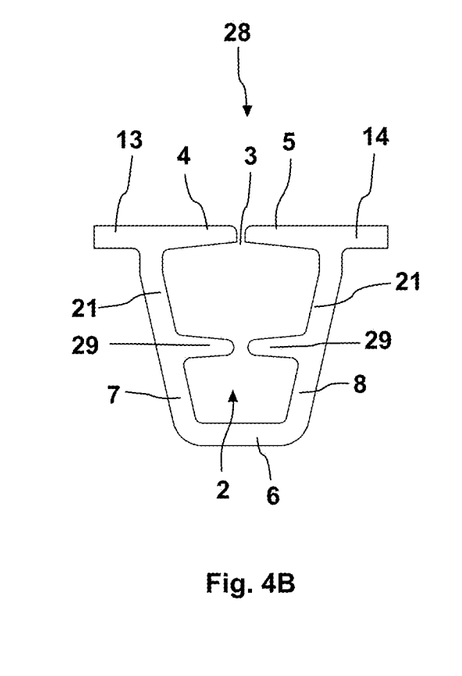
FIG. 4B is a schematic sectional illustration of the universal holder shown in FIG. 4A.

FIG. 4B shows a schematic sectional illustration of the universal holder 28 shown in FIG. 4A. In particular the narrowing, described above with reference to FIG. 4A, of the retaining receptacle 2 is shown, which is brought about only by the inclination of the lateral inner walls 7 and 8.

Figure 4C:
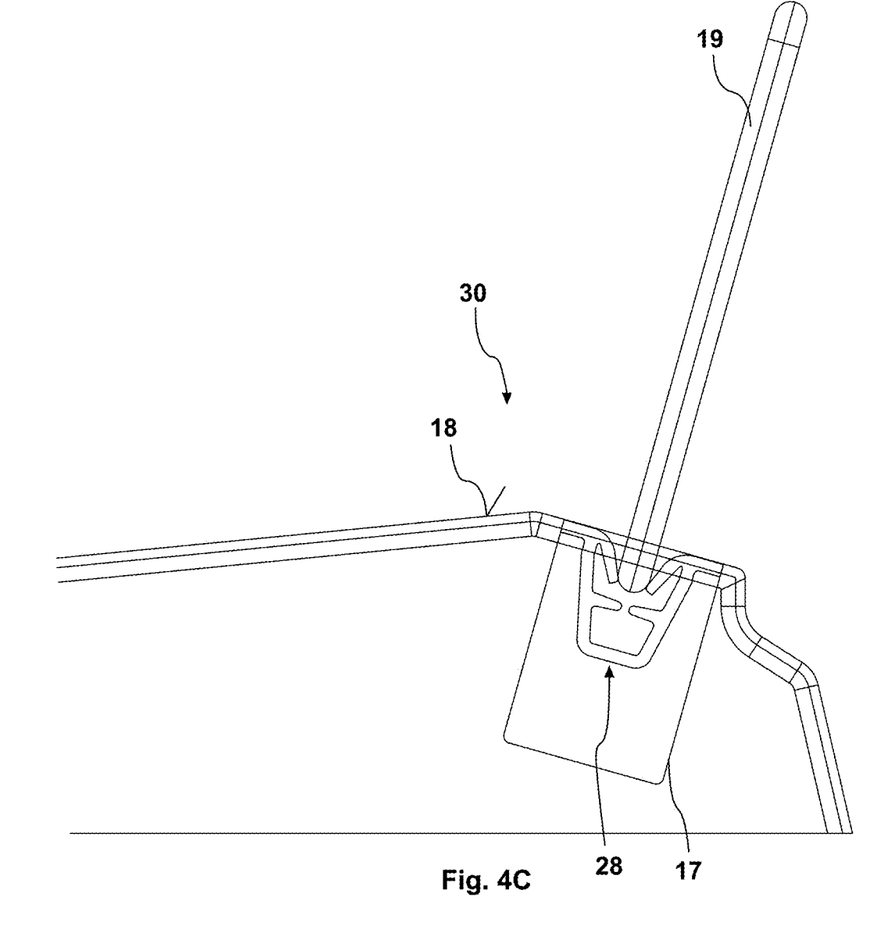
FIG. 4C is a schematic sectional illustration of a further exemplary embodiment of a vehicle interior lining component having the universal holder of FIG. 4A with inserted item and elastically deformed retaining lips bearing against the item.

FIG. 4C shows a schematic sectional illustration of a further exemplary embodiment of a vehicle interior lining component 30 having a universal holder 28 according to FIGS. 4A and 4B. The universal holder 28 is arranged entirely in a holder receptacle 17 on the vehicle interior lining component 30. The universal holder 28 is arranged in the holder receptacle 17 in such a way that the retaining lips 4 and 5 are arranged in a manner aligned with a surface 18, which is arranged next to the holder receptacle 17, of the vehicle interior lining component 30. An item 19 in the form of a smartphone has been partially introduced into the retaining receptacle 2 of the universal holder 28, such that the retaining lips 4 and 5 have been elastically deformed and bear against the outside of the item 19.

Figure 5A:
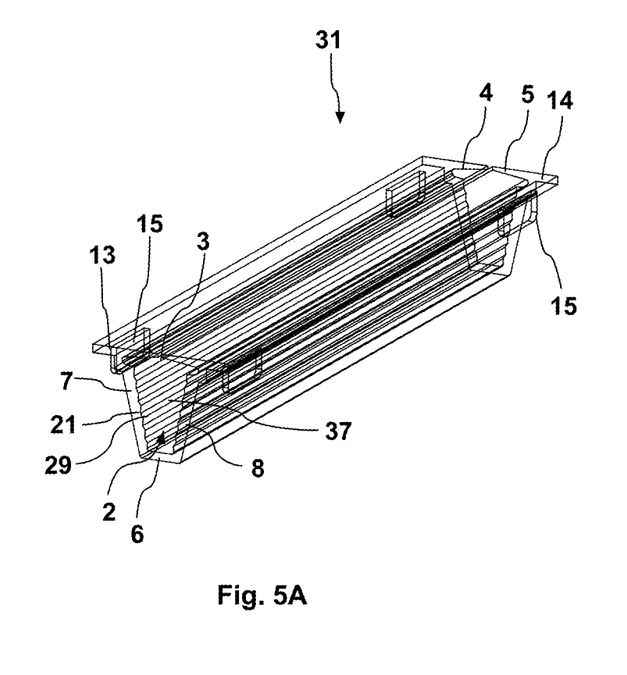
FIG. 5A is a schematic and perspective illustration of a further exemplary embodiment of a universal holder.

FIG. 5A shows a schematic and perspective illustration of a further exemplary embodiment of a universal holder 31 for retaining an item (not shown) on a vehicle interior lining component (not shown). The universal holder 31 differs from the exemplary embodiment shown in FIGS. 1A-1C in particular in that the lateral inner walls 7 and 8 are arranged in an inclined manner, forming a narrowing of the retaining receptacle 2, in that a retaining rib is not arranged on either lateral inner wall 7 or 8, and in that a multi-step gradation 37 that extends parallel to the access opening 3 is formed on each lateral inner wall 7 and 8, respectively. To avoid repetitions, reference is otherwise made to the above description for FIGS. 1A to 1C.

Figure 5B:
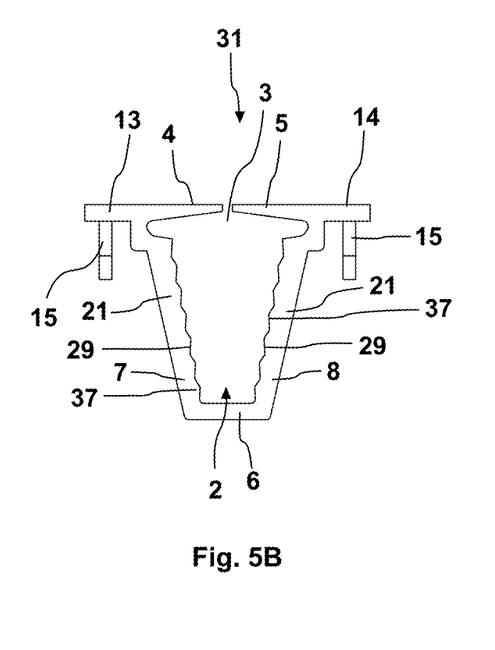
FIG. 5B is a schematic sectional illustration of the universal holder shown in FIG. 5A.

FIG. 5B shows a schematic sectional illustration of the universal holder 31 shown in FIG. 5A. In particular the narrowing, described above with reference to FIG. 5A, of the retaining receptacle 2 is shown, which is brought about only by the inclination of the lateral inner walls 7 and 8.

Figure 5C:
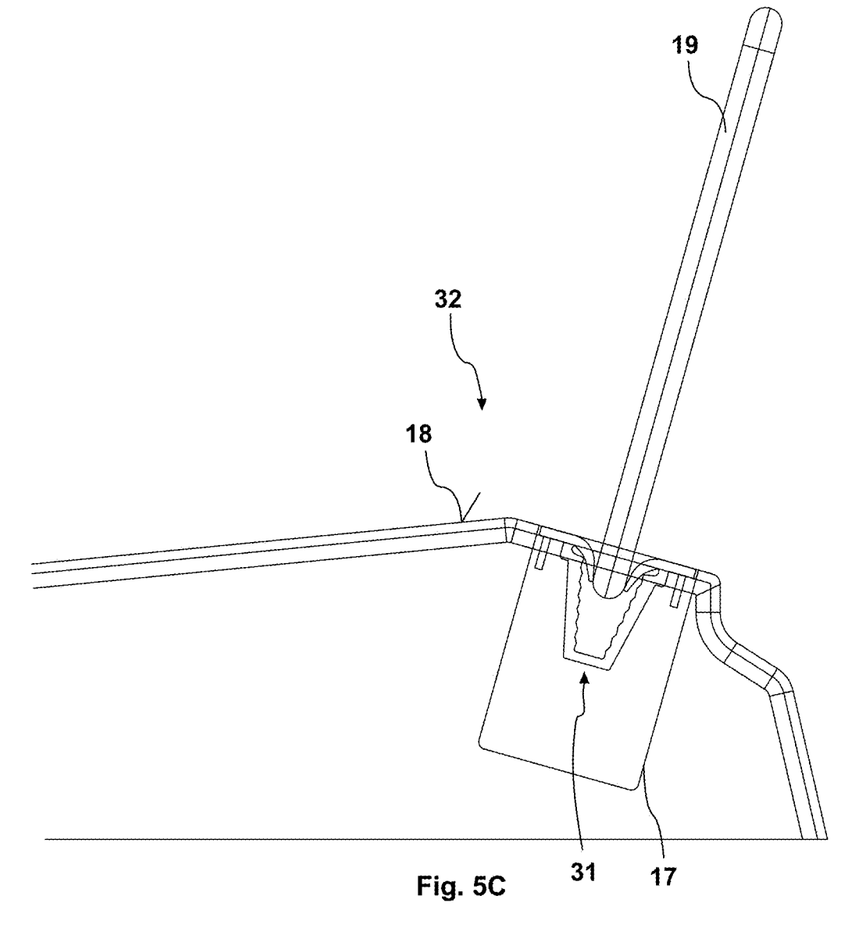
FIG. 5C is a schematic sectional illustration of a further exemplary embodiment of a vehicle interior lining component having the universal holder of FIG. 5A with an inserted item and elastically deformed retaining lips bearing against the item.

FIG. 5C shows a schematic sectional illustration of a further exemplary embodiment of a vehicle interior lining component 32 having a universal holder 31 according to FIGS. 5A and 5B. The universal holder 31 is arranged entirely in a holder receptacle 17 on the vehicle interior lining component 32. The universal holder 31 is arranged in the holder receptacle 17 in such a way that the retaining lips 4 and 5 are arranged in a manner aligned with a surface 18, which is arranged next to the holder receptacle 17, of the vehicle interior lining component 32. An item 19 in the form of a smartphone has been partially introduced into the retaining receptacle 2 of the universal holder 31, such that the retaining lips 4 and 5 have been elastically deformed and bear against the outside of the item 19.

Figure 6A:
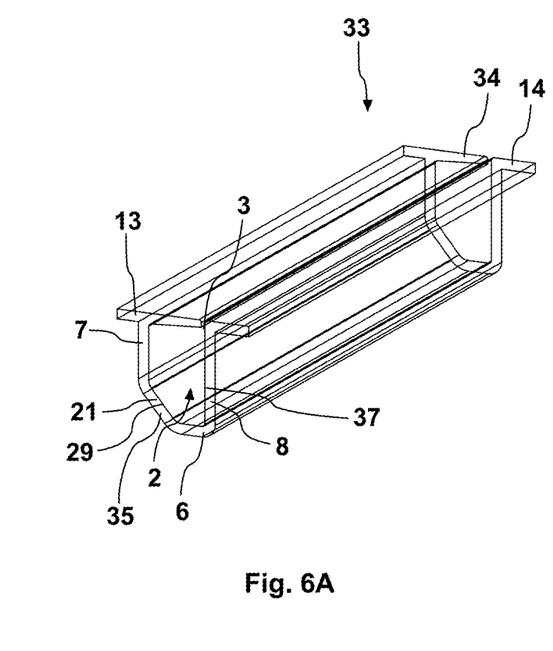
FIG. 6A is a schematic and perspective illustration of a further exemplary embodiment of a universal holder.

FIG. 6A shows a schematic and perspective illustration of a further exemplary embodiment of a universal holder 33 for retaining an item (not shown) on a vehicle interior lining component (not shown). The universal holder 33 differs from the exemplary embodiment shown in FIGS. 1A-1C in particular in that the universal holder 33 has only one retaining lip 34 that largely closes the access opening 3, in that no retaining ribs are arranged on the lateral inner walls 7 and 8, in that the lateral inner wall 7 has a narrowing portion 35, which is arranged in an inclined manner, forming a narrowing of the retaining receptacle 2, while the other lateral inner wall 8 does not extend in an inclined manner, and in that the universal holder 33 does not have any fastening elements as per the exemplary embodiment shown in FIGS. 1A-1C. To avoid repetitions, reference is otherwise made to the above description for FIGS. 1A-1C.

Figure 6B:
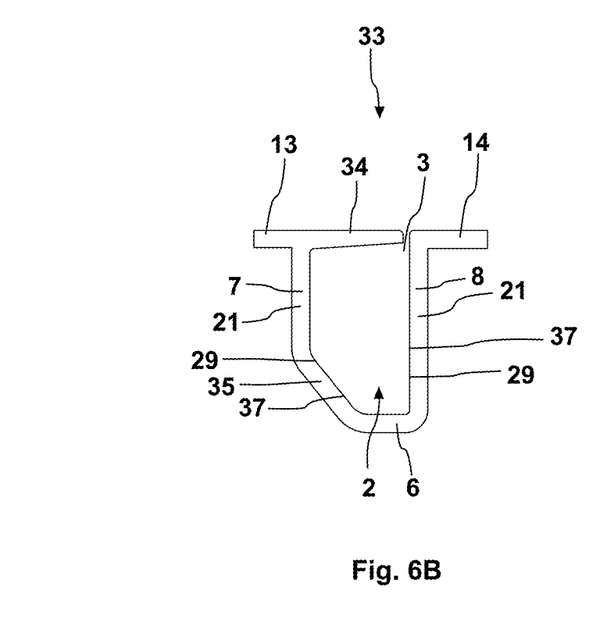
FIG. 6B is a schematic sectional illustration of the universal holder shown in FIG. 6A.

FIG. 6B shows a schematic sectional illustration of the universal holder 33 shown in FIG. 6A. In particular the narrowing, described above with reference to FIG. 6A, of the retaining receptacle 2 is shown, which is brought about only by the inclination of the narrowing portion 35 of the lateral inner wall 7.

Figure 6C:
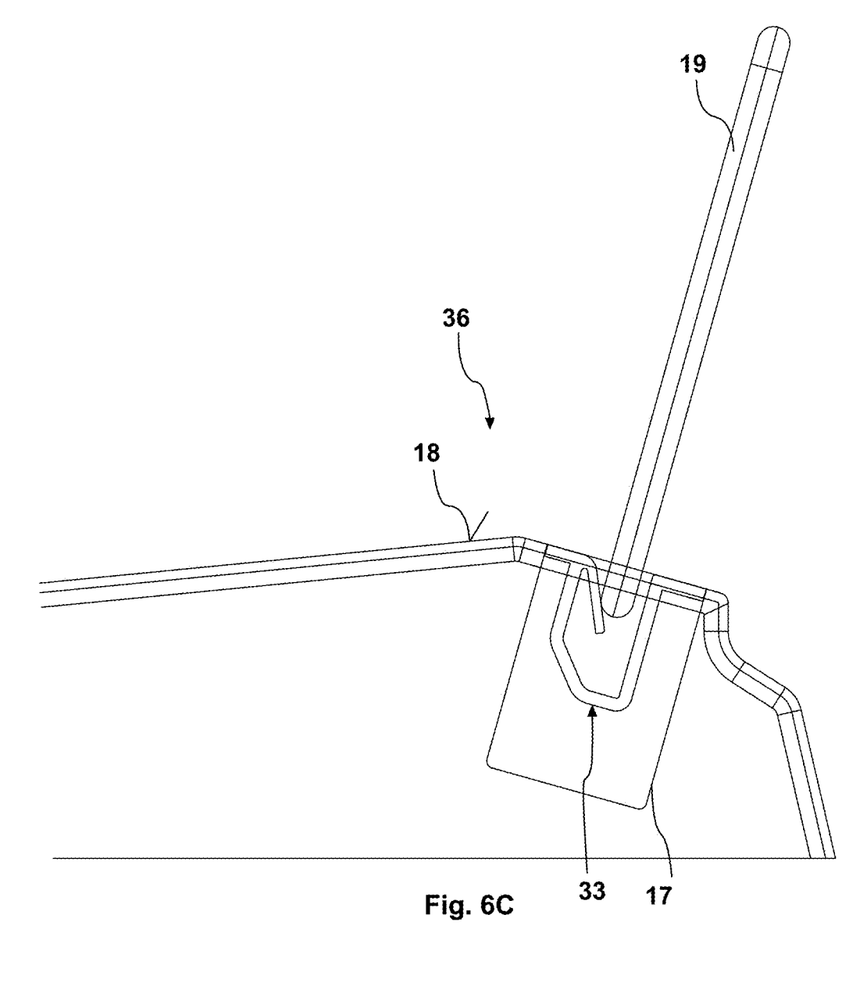
FIG. 6C is a schematic sectional illustration of a further exemplary embodiment of a vehicle interior lining component having the universal holder of FIG. 6A with an inserted item and an elastically deformed retaining lip bearing against the item.

FIG. 6C shows a schematic sectional illustration of a further exemplary embodiment of a vehicle interior lining component 36 having a universal holder 33 according to FIGS. 6A and 6B. The universal holder 33 is arranged entirely in a holder receptacle 17 on the vehicle interior lining component 36. The universal holder 33 is arranged in the holder receptacle 17 in such a way that the retaining lip 34 is arranged in a manner aligned with a surface 18, which is arranged next to the holder receptacle 17, of the vehicle interior lining component 36. An item 19 in the form of a smartphone has been partially introduced into the retaining receptacle 2 of the universal holder 33, such that the retaining lip 34 has been elastically deformed and bears against the outside of the item 19.

The universal holder has at least one retaining lip that at least largely closes the access opening and is produced at least partially from an elastomer.

It should be noted that the features and measures specified individually in the following description can be combined with one another in any desired technically meaningful way and disclose further configurations of the universal holder and vehicle interior lining component. The description additionally characterizes and specifies the invention, in particular in conjunction with the figures.

In order to retain an item by use of the universal holder according to one disclosure, the item is introduced partially into the retaining receptacle of the universal holder, with the result that the item comes into contact with the retaining lip of the universal holder and in the process displaces and elastically deforms the retaining lip. As a result of the elastic deformation, a restoring force is generated within the retaining lip, the restoring force pushing the retaining lip against the item, with the result that the item is clamped in place between the retaining lip and a further portion of the universal holder. As a result, the item is arranged in a positionally secure manner on the universal holder, and so any movements of the item relative to the universal holder, which could lead to the occurrence for example of disturbing rattling or clattering noises when a vehicle equipped therewith is being driven, are largely prevented. As a result, it is also possible for damage to the universal holder and/or the item retained thereby that is caused by such relative movements to be prevented.

The secure retention of the item on the universal holder according to the disclosure is even further improved in that the retaining lip can adapt to the outer shaping of the item to be retained in each case, with the result that, for example, a form-fit-like connection between the retaining lip and the item in question is possible. As a result, the universal holder can retain for example a smartphone, a tablet computer, a credit card, a parking card, a parking disk, a pair of spectacles, a coin or the like equally well in a positionally secure manner. The universal holder can thus take on the function of differently designed conventional holders, with the result that it is possible to dispense with the latter.

If the surface of the retaining lip that is in contact with the item in question is produced from the elastomer, a strong force fit can be created between the retaining lip and the item in question, the force fit likewise serving to retain the item in question immovably on the universal holder. In this case, the retaining lip can be produced partially or entirely from the elastomer. The elastomer can be, for example, a rubber.

Since the retaining lip largely or completely closes the access opening of the retaining receptacle, when no item is arranged on the universal holder, the universal holder does not impair an external appearance of a vehicle interior lining component, on which the universal holder is arranged, or only impairs it very slightly. As a result, the vehicle interior lining component has a tidy external appearance. As a result of the retaining lip or the closure of the retaining receptacle by the retaining lip, it is also possible to prevent dirt or other objects from getting into the retaining receptacle. The fact that the retaining lip at least largely closes the access opening means that the retaining lip closes more than 50%, more particularly more than 70%, more particularly more than 80%, and yet more particularly more than 90% of the access opening.

The retaining receptacle of the universal holder can be formed substantially in the manner of a blind hole or trough. The retaining receptacle can have side walls that define the access opening, and a receptacle bottom located opposite the access opening. The retaining receptacle can be formed, for example, in an elongate manner, i.e., have a length that is greater than a depth of the retaining receptacle and a multiple greater than a width of the retaining receptacle. The length of the retaining receptacle may be, for example, chosen such that a smartphone, a tablet computer or the like can be inserted or plugged partially into the retaining receptacle. In this example, the access opening can be formed in an approximately slot-like manner.

The depth of the retaining receptacle may be chosen such that only a very small portion of the item arranged in each case on the universal holder is located within the retaining receptacle. For example, the depth of the retaining receptacle can be so small that a display of a smartphone or tablet computer arranged on the universal holder is arranged largely or entirely outside the retaining receptacle, in order not to limit the view of the display or to limit it only slightly. In addition, an item inserted so little into the universal holder can be taken hold of more easily, since, for this purpose, the major part of the item is available outside the retaining receptacle. By contrast, conventional holders on which a smartphone is arrangeable hide about half of a display of the smartphone from view and thus make it inaccessible. In addition, the small depth of the universal holder makes it possible to arrange the universal holder on different vehicle interior lining components. For example, the universal holder can be arranged on a central console, an interior door panel or the like. The depth of the retaining receptacle can be, for example, less than 30 mm, more particularly, less than 25 mm or less than 20 mm.

The width of the retaining receptacle can be, for example, less than 50 mm, more particularly, less than 40 mm or less than 30 mm. The retaining receptacle can be configured for example in such a way that items with a thickness in a range from about 1.5 mm to about 15 mm can be introduced into the retaining receptacle.

The universal holder can retain differently designed items in a positionally secure manner and is therefore configured in a universally usable manner.

According to an advantageous configuration, the retaining receptacle narrows at least regionally in the direction of a receptacle bottom located opposite the access opening. In particular, the retaining receptacle can narrow conically toward the receptacle bottom with regard to a section plane perpendicular to the length of the retaining receptacle. As a result of the narrowing of the retaining receptacle, items with different thicknesses can be introduced into the retaining receptacle to different extents before they come into contact with mutually opposite lateral inner walls of the retaining receptacle, with the result that the end of the item introduced into the retaining receptacle is clamped in place. In this way, the positionally secure retention of the item by use of the universal holder is further improved. This effect can be improved further when at least those surfaces of the retaining receptacle that come into contact with the end of the item that is introduced into the retaining receptacle are produced from an elastomer. The retaining receptacle can narrow in at least one region or continuously over its entire depth.

In a further advantageous configuration, the universal holder has at least one retaining rib that is arranged on a lateral inner wall of the retaining receptacle, which extends parallel to the access opening, and is produced at least partially from an elastomer. The retaining rib can be elastically deformed by contact with a portion of an item that has been introduced into the retaining receptacle, creating a restoring force, with the result that the retention of the item on the universal holder is further improved. The retaining rib can extend along a part or an entire length of the retaining receptacle.

According to a further advantageous configuration, the universal holder has at least two retaining ribs that are arranged on the lateral inner wall and are arranged at different distances from the access opening, wherein the retaining rib arranged farther away from the access opening projects farther into the retaining receptacle than the retaining rib arranged closer to the access opening. As a result, the above-described narrowing of the retaining receptacle in the direction of the receptacle bottom can be realized.

According to a further advantageous configuration, the universal holder has at least two retaining ribs that are arranged on mutually opposite lateral inner walls and project into the retaining receptacle in mutually opposite directions. The mutually opposite lateral inner walls with the retaining ribs arranged thereon can be formed, for example, in an identical manner, such that the two mutually opposite retaining ribs are located at the same height.

In a further advantageous configuration, the universal holder has at least one fastening element, arranged on a laterally projecting flange, for fastening the universal holder to the vehicle interior lining component. The fastening element can be, for example, in the form of a fastening pin, which is able to be plugged into a fastening bore in the vehicle interior lining component. The fastening pin can have at least one latching groove in order to be able to be latched to the vehicle interior lining component via a latching mechanism. The universal holder can also have two or more fastening elements. The laterally projecting flange can lie, for example, in the same plane as the at least one retaining lip.

According to a further advantageous configuration, the universal holder has two retaining lips that together at least largely close the access opening and extend in mutually opposite directions. Thus, the two retaining lips together largely or fully close the access opening. The use of two retaining lips that extend in mutually opposite directions supports central insertion of a portion of an item into the retaining receptacle in the universal holder.

According to a further advantageous embodiment, the universal holder is formed in one piece. The universal holder can be produced, for example, by cutting off a portion from a hollow profile produced monolithically from an elastomer, which may have been produced, for example, in an extrusion process or injection-molding process. The universal holder formed in one piece does not have any components to be connected mechanically together, thereby simplifying the production of the universal holder and the mounting of the universal holder on a vehicle interior lining component.

The vehicle interior lining component which has at least one universal holder according to one of the abovementioned configurations or a combination of at least two of these configurations with one another, wherein the universal holder is arranged at least partially in a holder receptacle on the vehicle interior lining component.

The advantages mentioned above with regard to the universal holder are associated in a corresponding manner with the vehicle interior lining component. The vehicle interior lining component can be, for example, a central console, an interior door panel or the like. The universal holder can be inserted partially or fully into the holder receptacle.

According to an advantageous configuration, the universal holder is arranged in the holder receptacle in such a way that the at least one retaining lip is arranged in a manner aligned with a surface, arranged next to the holder receptacle, of the vehicle interior lining component. As a result, the external appearance of the vehicle interior lining component is not impaired or is only slightly impaired by the presence of the universal holder.

It is to be understood that variations and modifications can be made on the aforementioned structure without departing from the concepts of the present invention, and further it is to be understood that such concepts are intended to be covered by the following claims unless these claims by their language expressly state otherwise.

What is claimed is:

1. A universal holder for retaining an item on a vehicle interior lining component, the universal holder comprising:
   a retaining receptacle having an access opening and a receptacle bottom located opposite the access opening; and
   at least one retaining lip that at least largely closes the access opening and is produced at least partially from an elastomer, wherein the at least one retaining lip elastically deforms and bears against an inserted item, wherein the retaining receptacle narrows at least regionally between the at least one retaining lip and the receptacle bottom, and wherein the retaining receptacle includes:
      at least one chosen from the following receptacle-regionally-narrowing features: a retaining rib, multi-step gradation, a lip-like retaining rib, a step, and an inclined portion.

2. The universal holder according to claim 1 further comprising the at least one retaining rib arranged on a lateral inner wall of the retaining receptacle and extending parallel to the access opening and produced at least partially from an elastomer.

3. The universal holder according to claim 2, wherein the at least one retaining rib comprises at least two retaining ribs arranged on the lateral inner wall and arranged at different distances from the access opening, wherein a first retaining rib arranged farther away from the access opening projects farther into the retaining receptacle than a second retaining rib arranged closer to the access opening.

4. The universal holder according to claim 2, wherein at least two retaining ribs are arranged on mutually opposite lateral inner walls and project into the retaining receptacle in mutually opposite directions.

5. The universal holder according to claim 1 further comprising at least one fastening element arranged on a laterally projecting flange for fastening the universal holder to the vehicle interior lining component.

6. The universal holder according to claim 1, wherein the at least one retaining lip comprises two retaining lips that together at least largely close the access opening and extend in mutually opposite directions.

7. The universal holder according to claim 1, wherein the universal holder is formed in one piece.

8. The universal holder according to claim 1, wherein the universal holder is located in a holder receptacle on the interior lining component on a vehicle.

9. The universal holder according to claim 8, wherein the universal holder is arranged in the holder receptacle such that the at least one retaining lip is aligned with a surface, which is arranged next to the holder receptacle of the vehicle interior lining component.

10. A universal holder for retaining an item on a vehicle interior lining component, the universal holder comprising:
    a retaining receptacle with an access opening; and
    at least one retaining lip that at least largely closes the access opening and is produced at least partially from an elastomer, wherein the at least one retaining lip elastically deforms and bears against an inserted item, wherein the retaining receptacle narrows at least regionally between the at least one retaining lip and a receptacle bottom located opposite the access opening, and wherein the retaining receptacle includes:
       at least one chosen from the following receptacle-regionally-narrowing features: a retaining rib, a multi-step gradation, a lip-like retaining rib, a step, and an inclined portion.

11. The universal holder according to claim 10, wherein the at least one retaining rib is arranged on a lateral inner wall of the retaining receptacle and extends parallel to the access opening and is produced at least partially from an elastomer.

12. The universal holder according to claim 11, wherein the at least one retaining rib comprises at least two retaining ribs arranged on the lateral inner wall and arranged at different distances from the access opening, wherein a first retaining rib arranged farther away from the access opening projects farther into the retaining receptacle than a second retaining rib arranged closer to the access opening.

13. The universal holder according to claim 10, wherein at least two retaining ribs are arranged on mutually opposite lateral inner walls and project into the retaining receptacle in mutually opposite directions.

14. The universal holder according to claim 10, wherein the at least one retaining lip comprises two retaining lips that together at least largely close the access opening and extend in mutually opposite directions.

15. A vehicle interior lining component comprising:
    a holder receptacle; and
    a universal holder arranged at least partially in the holder receptacle on the vehicle interior lining component, the universal holder comprising:
       a retaining receptacle with an access opening; and
       at least one retaining lip that at least largely closes the access opening and is produced at least partially from an elastomer, wherein the at least one retaining lip elastically deforms and bears against an inserted item, wherein the retaining receptacle narrows at least regionally between the at least one retaining lip and a receptacle bottom located opposite the access opening, and wherein the retaining receptacle includes:
          at least one chosen from the following receptacle-regionally-narrowing features: a retaining rib, a multi-step gradation, a lip-like retaining rib, a step, and an inclined portion.

16. The vehicle interior lining component according to claim 15, wherein the universal holder is arranged in the holder receptacle such that the at least one retaining lip is arranged aligned with a surface arranged next to the holder receptacle of the vehicle interior lining component.

17. The vehicle interior lining component according to claim 15, wherein the at least one retaining receptacle narrows at least regionally in the direction of a receptacle bottom located opposite the access opening.

18. The vehicle interior lining component according to claim 15 further comprising at least one retaining rib arranged on a lateral inner wall of the retaining receptacle and extending parallel to the access opening and produced at least partially from an elastomer.

19. The vehicle interior lining component according to claim 18, wherein the at least one retaining rib comprises at least two retaining ribs arranged on the lateral inner wall and arranged at different distances from the access opening, wherein a first retaining rib arranged farther away from the access opening projects farther into the retaining receptacle than a second retaining rib arranged closer to the access opening.

* * * * *